United States Patent [19]

Helava et al.

[11] 3,726,591

[45] Apr. 10, 1973

[54] STEREOPLOTTING APPARATUS FOR CORRELATING IMAGE POINTS DISPOSED ALONG EPIPOLAR LINES

[75] Inventors: Uuno V. Helava; Walter E. Chapelle; John A. Hornbuckle, all of Southfield, Mich.

[73] Assignee: The Bendix Corporation

[22] Filed: Dec. 8, 1971

[21] Appl. No.: 206,075

[52] U.S. Cl. ................................356/2, 250/220 SP
[51] Int. Cl. ...........................................G01c 11/12
[58] Field of Search ......................356/2; 250/220 SP

[56] References Cited

UNITED STATES PATENTS 3,595,995 7/1971 Hobrough............................356/2 X
3,597,083 8/1971 Fraser ....................................356/2

*Primary Examiner*—Ronald L. Wibert
*Assistant Examiner*—F. L. Evans
*Attorney*—John S. Bell et al.

[57] ABSTRACT

A stereomapper that includes apparatus for scanning a high intensity spot or point of light across two stereo images. The images modulate received light. Conjugate points are identified by apparatus that measures the correlation between the intensities of modulated light representing points along the two stereo images. Conjugate points are rapidly and conveniently identified by limiting the search for conjugate points to points along corresponding epipolar lines. The coordinates of points identified to be conjugate points are used to calculate the position of the actual point of the scene represented by the conjugate points.

17 Claims, 6 Drawing Figures

STEREOPLOTTING APPARATUS FOR CORRELATING IMAGE POINTS DISPOSED ALONG EPIPOLAR LINES

BACKGROUND OF THE INVENTION

1. Field of the Invention

Stereophotogrammetry — The art of obtaining accurate three- dimensional measurement of a scene using two-dimensional images of that scene.

2. Brief Description of the Prior Art

Automatic stereomappers that match conjugate image details as they appear on two stereo images of a scene are known. One class of known automatic stereomappers include apparatus for scanning small spots of light across two stereo images. The light spots are modulated in accordance with the image detail on the stereo images. The correlation between the intensities of light modulated by different points on the two stereo images is measured in order to identify conjugate image points. A maximum of correlation identifies conjugate points. The positions of conjugate points on the two stereo images are used to calculate the positions in the actual scene of points represented by pairs of conjugate image points.

Corresponding objects or image details on the two stereo images have somewhat different shapes because each stereo image illustrates the scene from a different vantage point. Other factors such as differential film shrinkage also cause corresponding image details to have different shapes on different stereo images. Known automatic stereomappers that provide accurate output measurements therefore include scan shaping apparatus for controlling the motion of the light spots being scanned across the two stereo images. The scan shaping apparatus causes the light spot on one stereo image to follow a somewhat different path from that followed by the spot on the other so that each spot is moved along corresponding imagery. One of the key problems in the art is to determine what the different paths across two stereo images ought to be to scan conjugate imagery. The scan shaping that must be provided to scan points along conjugate imagery on two stereo images is determined in prior art stereoplotters by measuring parallaxes over different areas around various points of interest and using those parallax measurements to shape scanning motion. The requirement for scan shaping in prior art stereomappers increases the complexity of stereomapping, and therefore, increases the cost and reduces the speed of those mappers.

The amount of required scan shaping or difference between the paths followed by spots illuminating points onto stereo images is determined by the nature of the terrain represented by those images. If the terrain is very accidental, the motion of the spot illuminating one stereo image will be very irregular and thus very different from the motion of the spot illuminating the other stereo image. In addition, the illuminating spots must be moved very rapidly so that all conjugate points of interest on the two stereo images can be identified in a reasonable time. Because of the requirement for rapid motion along a complex scan pattern, most prior art automatic stereomappers use one or more cathode ray tubes to provide the illuminating light spots and to scan those light spots across the stereo images. However, a cathode ray tube provides a relatively weak signal. The light spots modulated by the stereo images therefore have a low signal to noise ratio which causes errors to be introduced into the correlation measurements. In addition, even the prior art stereomappers employing cathode ray tubes are relatively slow because of the large number of points on the second stereo image that must be compared with each point on the first in order to identify a pair of conjugate points. And finally, portions of many stereo images have relatively little image detail. Prior art stereomappers often become lost when confronted with such an area on an image. Imagery on the second stereo image conjugate to imagery along a scan line on the first stereo image may lie along any one of a number of different scan directions. Prior art stereomappers are, therefore, often unable to project a scan across an area having little image detail and continue to identify conjugate points as the illuminating points return to areas of the stereo images having more image detail.

SUMMARY OF THE INVENTION

The subject invention comprises control apparatus for controlling the operation of stereomappers, stereoplotters, and similar devices that measure the correlation between points on stereo images of a scene in order to identify conjugate points. The control apparatus of this invention comprises means for limiting correlation measurement to a measurement of the correlation between points lying substantially along corresponding epipolar lines on two stereo images. Conjugate points on two stereo images lie substantially along corresponding epipolar lines across those images. By limiting the search for conjugate points to an examination of corresponding epipolar lines, the control apparatus of this invention increases the speed at which conjugate points can be identified. The control apparatus of this invention may increase the speed of a stereomapping or similar device into which is incorporated by as much as two orders of magnitude by eliminating the requirement of the prior art systems to compare a point on one stereo image with points lying along many different lines on another stereo image in order to identify conjugate points.

As used herein, an epipolar line across a stereo image is a line defined by the intersection of that stereo image and an epipolar plane. An epipolar plane is any plane that includes the vantage points of each of two stereo images and at least one point on the scene represented by those two stereo images. There are an infinite number of different possible epipolar planes for any two stereo images. The different epipolar planes can be generated by selecting a single epipolar plane and rotating that plane about a line connecting the two vantage points of the two stereo images. Different epipolar planes intersect the stereo image at different positions and thus provide different epipolar lines. The term "corresponding epipolar lines" is used herein to identify the two epipolar lines, one on each stereo image, provided by the same epipolar plane. Epipolar lines on two stereo images that view a scene from different vantage points at the same elevation run parallel to the projection onto the two stereo images of the line connecting the vantage points of those stereo images. Epipolar lines on stereo images that view a scene from two different vantage points at different elevations define a fan pattern. The fanning epipolar lines across any one of the two stereo images project from the point at which an extension of the line connecting the vantage points of the two stereo images intersects the plane of that one image.

The invention also comprises complete stereomapping and stereoplotting devices having control apparatus for limiting correlation measurements to a measurement of the correlation between points lying along corresponding epipolar lines on two stereo images. A projection type stereomapper is illustrated herein in which two stereo images of a scene are held so that light from a point source is projected onto one point or spot on each of those stereo images. The point source of light is scanned across a reference plane beneath the stereo images in order to move the illuminated points on those images along corresponding epipolar lines. The images modulate received light. The correlation between the intensities of modulated light representing various points on the two stereo images is measured in order to identify the positions of conjugate points. Calculating apparatus uses the positions of points identified to be conjugate points to calculate the position in a scene of each point represented by a pair of conjugate points.

The apparatus of this invention eliminates the needs to shape the scanning motion of light spots illuminating two stereo images. It is unnecessary with the subject invention to scan along an irregular line on one stereo image in order to identify the points on that one stereo image conjugate to points along the regular line on the other stereo image. In the subject invention, high intensity spots or points of light are scanned along simplified scan patterns, namely along epipolar lines, on each stereo image. High intensity spots are scanned along simplified scan patterns at high speeds to conveniently and quickly identify all conjugate imagery of interest on the stereo images. The high intensity of the illuminating light spots causes light modulated by the stereo images to have a high signal to noise ratio so that accurate correlation measurements can be obtained.

The stereomapper illustrated herein includes control apparatus for controlling the operation of a correlator to limit correlation measurements so that points on one portion of an epipolar line on a first stereo image need only be compared with points along a relatively small portion of a corresponding epipolar line on another stereo image in order to identify conjugate points on those images. The positions of first sets of conjugate points lying along corresponding first epipolar lines on two stereo images are identified. Points spaced a particular distance from the identified first set of conjugate points on one stereo image are compared only with points lying along an interval spaced a similar distance from the identified first set of conjugate points on the second stereo image. The interval of points on the second stereo image includes more points than the set to be identified and is, therefore, somewhat longer than than set because the relative positions of conjugate points will be different on two stereo images that view a scene from different vantage points. However, the interval is substantially shorter than a complete epipolar line across a stereo image. The limitation of correlation measurements to a comparison of points on one stereo image with only those points along an interval of a corresponding epipolar line on the other stereo image therefore significantly increases the speed at which conjugate points can be identified.

The position of each identified set of conjugate points is recorded and the position of each new interval to be examined is defined with respect to a set of conjugate points located relatively close to that interval. The difference between the spacing between two points on one stereo image and the spacing between the conjugates of those points on another stereo image is generally quite small for points that are spaced relatively close together. The defining of the position of an interval to be inspected with respect to points located close to that interval minimizes the length that the interval must have to insure that the points searched for are included in the interval, and therefore, increases the speed at which conjugate points are identified.

The correlating apparatus illustrated herein measures the correlation between a set of points along an epipolar line on one stereo image and various sets of points along a corresponding epipolar line on a second stereo image. The correlation measuring apparatus identifies the set of points along an epipolar line on the other stereo image having a maximum correlation with a selected set on the first stereo image. A maximum correlation is obtained between sets of conjugate points. The sets have a sufficient number of points so that there is little likelihood that a high correlation will be obtained between sets unless they are sets of conjugate points.

BRIEF DESCRIPTION OF THE DRAWINGS

Further objects, features and advantages of this invention, which is defined by the appended claims, will become apparent upon a consideration of the following description and accompanying drawings in which:

DETAILED DESCRIPTION OF THE DRAWINGS

Figure 1:
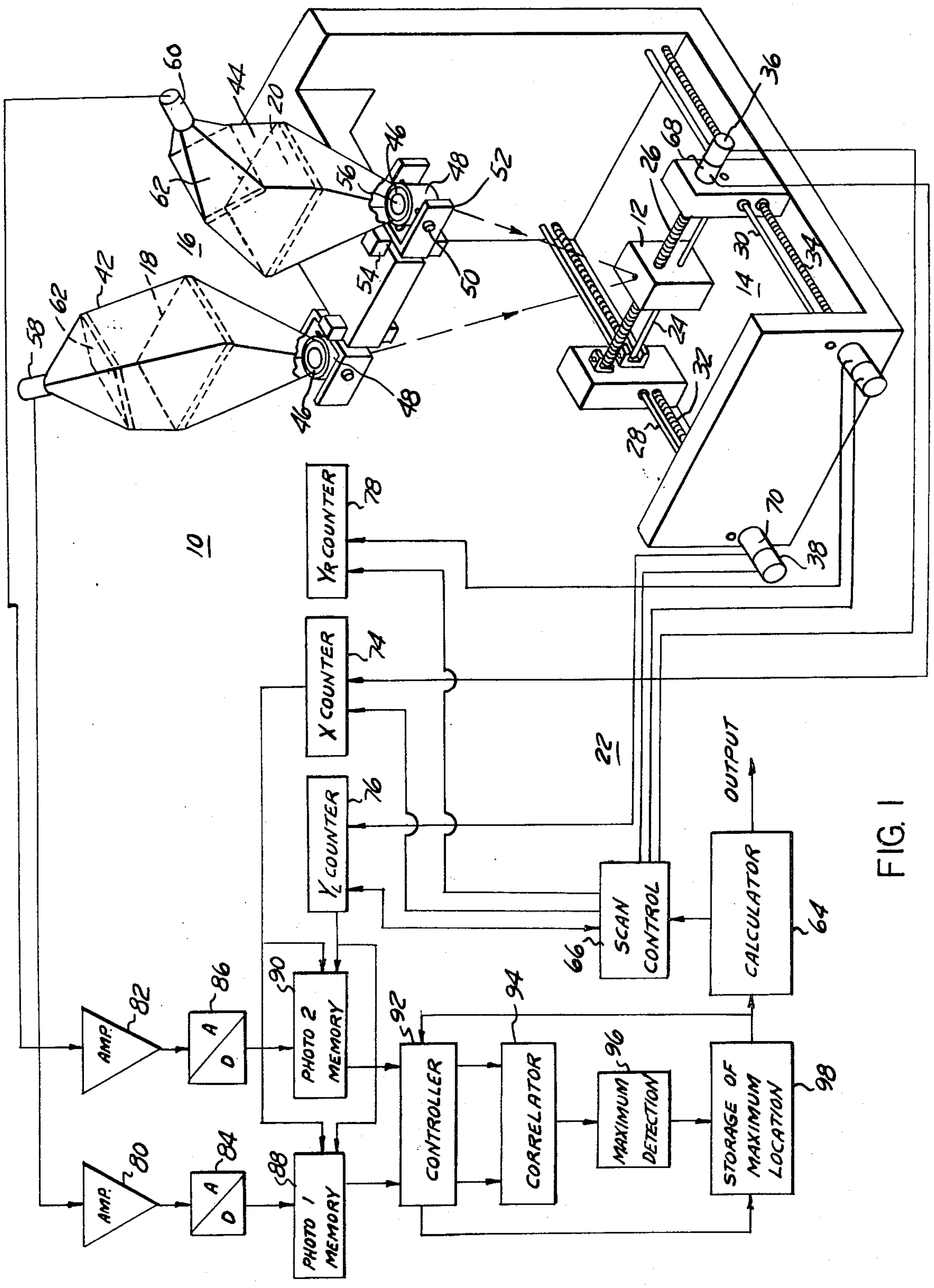
FIG. 1 is a schematic, partially perspective diagram of a stereomapper embodiment of this invention.

FIG. 1 illustrates a stereomapper 10 for automatically identifying conjugate points on two stereo images of a scene, and for using the positions of each pair of conjugate points to calculate the X, Y, and Z coordinates of each point in the scene represented by an identified pair of conjugate points. The stereomapper 10 includes a laser generator 12 for generating a small, bright spot of light or laser, a mechanical scanning apparatus 14 for scanning generator 12 along a reference plane, a housing structure 16 for holding two stereo images 18 and 20 so that light from generator 12 strikes one point on each stereo image, and electronic apparatus 22 for controlling operation of mechanical scanning apparatus 14. Light striking a stereo image is modulated by that image. Electronic apparatus 22 receives the modulated light and measures the correlation between the intensity of light representing various points on the stereo images in order to identify the positions of conjugate points on those images. The position of each pair of conjugate points is used to calculate the three-dimensional coordinates of the point in the scene represented by that conjugate point pair.

The apparatus 13 for moving light generator 12 to scan a point or small spot of light across each of the stereo images 18 and 20 includes a supporting guide rod 24 and screw 26 which hold generator 22. Rod 24 and screw 26 are movably mounted on two guide rods 28 and 30, and two screws 32 and 34. Motors 36, 38, and 40 are connected to the screws 26, 32, and 34 respectively to rotate those screws in response to command signals received from electronic apparatus 22 and thereby move laser generator 12. Screw 26 and guide rod 24 are mounted so that motors 38 or 40 can operate independently of each other and place screw 26 and guide rod 24 at a skew angle to the X axis of the mapper 10. Motor 36 can, therefore, move generation 12 along a line forming an angle with the X axis of mapper 10.

The structure 16 for holding stereo images 18 and 20 permits an operator to rotate each stereo image about three orthogonal axes and also permits him to change the relative elevations of those stereo images so that stereo images can be placed in positions with respect to each other that correspond to the relative positions that cameras would occupy to form those images. This apparatus includes two housings 42 and 44 for holding stereo images 18 and 20 respectively. The base of each housing comprises a ring 46 that is rotatably mounted in and outer ring 48 so that an operator can rotate the stereo images with respect to each other. Each double ring is rotatably mounted on a shaft 50 that is held by a U-shaped support 52. Each U support 52 is rotatably mounted on a slide 54 so that an operator may either rotate the U supports or move them laterally to change the relative elevations of the stereo images 18 and 20. The stereo images 18 and 20 are positioned in housings 42 and 44 respectively so that the projection center of each stereo image is located at the center of the ring 46 forming the base of that housing. Each ring 46 holds a lens 56 that focuses light from generator 12 onto one point on the stereo image located above that lens. The illuminated point on each stereo image is scanned across that image by mechanical scanning apparatus 14 which scans generator 12 across a reference plane located beneath stereo images 18 and 20. Photomultiplier tubes 58 and 60 are attached to the housings 42 and 44 respectively to receive light from stereo images 18 and 20 and convert received light signals to electrical signals that are processed by the electronic apparatus 22. A Fresnel lens 62 is disposed in each of the housings 42 and 44 to act as a collector and insure that light striking any point on a held stereo image will be transmitted to the photomultiplier tube located above that stereo image.

The electronic apparatus 22 controls the motion of laser generator 12. The apparatus for effecting this control includes a calculator 64 for generating command signals, and a scan control circuit 66 for transmitting those command signals to motors 36, 38, and 40. Encoders 68, 70, and 72 provide output signal pulses in response to rotation of motors 36, 38, and 40 respectively. Counters 74, 76, and 78 receive signal pulses provided by encoders 68, 70, and 72 respectively and sum the received signal pulses to provide feedback signals to scan control 66 which indicate when the motors 36, 38, and 40 have moved the generator to the position identified by a particular set of command signals.

Electronic apparatus 22 also measures the correlation between the intensities of light modulated by various points on stereo images 18 and 20 in order to identify the positions of conjugate points. The apparatus for performing these correlation measurements and identifying conjugate points includes two amplifiers 80 and 82 for amplifying electrical signals received from photomultipliers 58 and 60 respectively. Amplifiers 80 and 82 provide analog output signals that are converted to digital form by analog to digital converters 84 and 86 represent the intensity of modulated light received from points on stereo images 18 and 20 respectively. These intensity representing signals are stored in storage registers 88 and 90. The registers also receive signals from counters 74 and 76 identifying the location on stereo images 18 and 20 associated with each intensity signal received from converters 84 and 86.

A controller 92 controls the transmission of information from memories 88 and 90 to a correlator 94 which measures the correlation between received signals. Controller 92 transmits sets of signals to correlator 94 which compares a set of points received from memory 88 with various sets received from memory 90 and provides an output indicating the degree of correlation between received sets. A maximum detecting circuit 96 is positioned to receive output signals from correlator 94 and provide an output whenever a signal is received that is larger than previously received signals. The output from detecting circuit 96 activates a storage register 98 permitting that register to receive from controller 92 the coordinates of the points having the higher correlation detected by correlating circuit 94. A maximum correlation is obtained between conjugate points. Storage register 98 stores in predetermined storage locations the coordinates of each pair of points on stereo images 18 and 20 identified to be conjugate points by correlator 94 and maximum detecting circuit 96. The locations of conjugate points of the two stereo images are transmitted to calculator 64 which calculates the positions of each point in the actual scene represented by a pair of conjugate points on the two stereo images. The locations of conjugate points are also returned to controller 92 which uses those locations to limit and to modify the number of sets that will be transmitted from register 90 in order to identify the set conjugate to a subsequent set transmitted from register 88.

Figure 2:
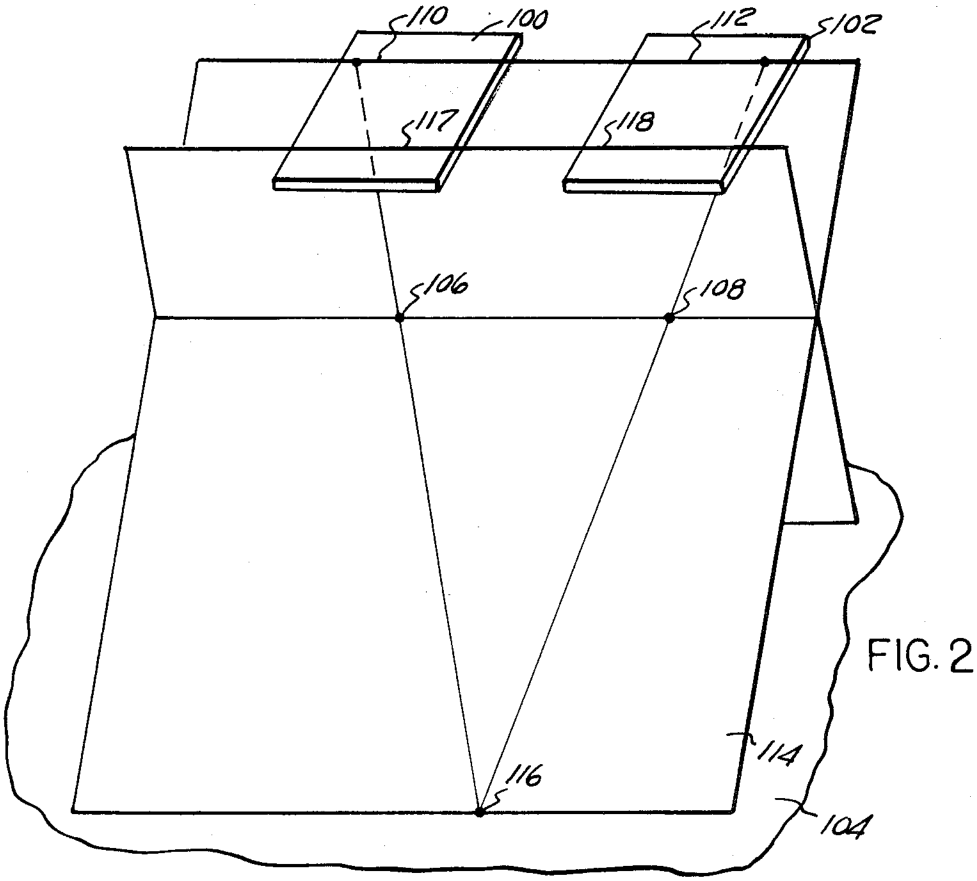
FIG. 2 is a perspective view of two images of a land area taken from different vantage points at the same elevation that illustrates the concept of epipolar lines for such images.

In operation, light from generator 12 strikes one point on each of the stereo images 18 and 20. Generator 12 is moved by mechanical apparatus 14 to scan the illuminated points on each stereo image along corresponding epipolar lines. In order to scan the points in this manner, the positions of the stereo images 18 and 20 are adjusted to place those images in positions with respect to each other that correspond to the relative positions that cameras would occupy to form those images. The orientation of various types of images and the scanning of light spots across those images is explained with respect to FIGS. 2 and 3. FIG. 2 illustrates two photographic images 100 and 102 of a land mass 104 taken from different vantage points 106 and 108 at the same elevation. Corresponding epipolar lines 110 and 112 on the two stereo images 100 and 102 are defined by an epipolar plane 114 that intersects those images. The epipolar plane 114 is defined by vantage points 106 and 108, and by one point 116 on the scene or land mass 104. The epipolar lines 110 and 112 run parallel to the projection of a line connecting vantage points 106 and 108 onto those stereo images. Different epipolar lines such as lines 117 and 118 are generated by rotating epipolar plane 114 about the line connecting vantage points 106 and 108. Each epipolar line on stereo images 100 and 102 will run parallel to lines 110 and 112. Light spots are scanned along the images taken from different vantage points at the same elevation by first properly orienting those images in the stereomapper 10 and then scanning generator 12 along lines parallel to the projection of a line connecting the projection centers of the two stereo images onto the plane across which generator 12 is moved.

Figure 3:
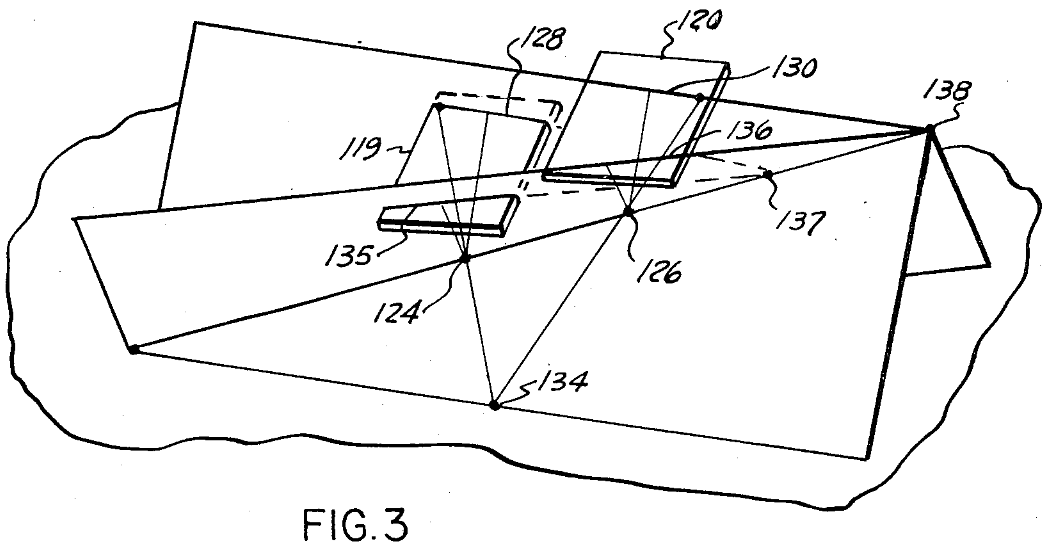
FIG. 3 is a perspective view of two images of a land area taken from different vantage points at different elevations which illustrates the concept of epipolar lines for such images.

FIG. 3 illustrates two photographic images 119 and 120 of a scene or land mass 122 taken from different vantage points 124 and 126 at different elevations. Corresponding epipolar lines 128 and 130 on the stereo images 119 and 120 are defined by an epipolar plane 132 which intersects those images. Epipolar plane 132 is defined by the two vantage points 124 and 126 and by one point 134 on land mass 122. Different epipolar lines such as lines 135 and 136 can be generated by rotating epipolar plane 132 about the line connecting vantage points 124 and 126. The epipolar lines on stereo image 119 are straight lines that define a fan pattern and project from a point 137 at which the projection of a line connecting vantage points 124 and 126 intersects the plane of image 119. Similarly, the various epipolar lines on stereo image 120 comprise straight lines projecting from a point 138 at which the projection of the line connecting vantage points 124 and 126 intersects the plane of stereo image 120. Light spots are scanned along corresponding epipolar lines on images taken from different vantage points at different elevations by first properly orienting those images in the mapper 10 and by then scanning generator 12 along lines radiating from the point at which the extension of a line connection the projection centers of those two images intersects the plane across which generator 12 is moved.

Figure 4:
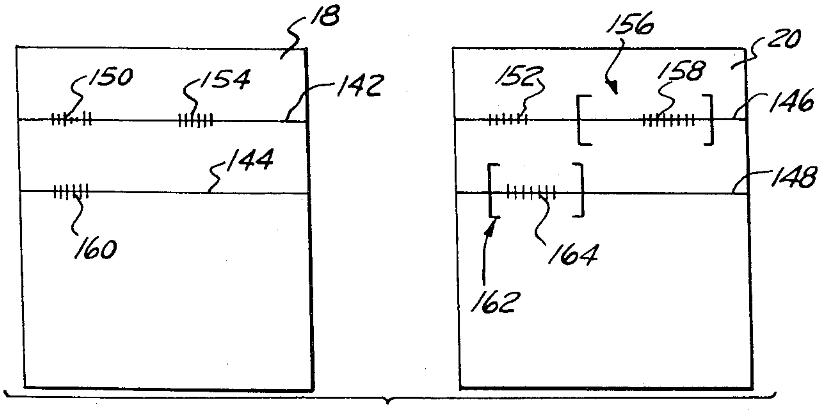
FIG. 4 is a plan view of two stereo images showing the spacing between various conjugate points on those images to illustrate several modes of operation of the apparatus of FIG. 1.

The operation of control circuit 92 and correlator 94 is explained with reference to FIG. 4. FIG. 4 is a plan view of the two stereo images 18 and 20 that shows two epipolar lines 142 and 144 on stereo image 12 and two epipolar lines 146 and 148 on stereo image 20 that correspond to the epipolar lines 142 and 144 on image 18. In order to identify the location of first sets of conjugate points on the two images 18 and 20, controller 92 first transmits control signal to storage register 98 that clears the first two sets of storage locations in that register. Controller 92 than transmits to correlator 94 the intensities of a first set of points 150 on epipolar line 142 and a sufficient number of points along epipolar line 146 to enable correlator 94 to identify the set 152 of points on line 146 that is a conjugate of set 150. For example, for a set 150 of 16 points along line 142, controller 92 transmits the intensities of those points and the intensities of points along line 146 so that correlator 94 will measure the correlation between the set 150 and points 1 through 16, 2 through 17, 3 through 18, and so forth along line 146 until a maximum correlation measurement is obtained thereby identifying set 152 of points along line 146 conjugate to set 150. The locations of the points of set 150 on line 142 is stored in the first set of storage locations of register 98. Whenever a set of points on line 146 is detected that has a greater correlation with set 150 than all sets previously examined, maximum detecting circuit 96 causes the coordinates of that set to replace whatever value had been stored in the second set of storage locations of register 98. Since a maximum correlation will be obtained between set 150 and set 152 of points conjugate to set 150, the positions of the points of set 152 will ultimately be stored in the second set of storage locations of register 98.

The coordinates of points identified to be conjugate points are transmitted to controller 92 which uses two coordinates to limit the number of points that need be inspected in order to identify the set of points along epipolar line 146 conjugate to a second set 154 of points along line 142. To find these conjugate points, controller 92 first transmits a signal to register 98 which clears the second two sets of storage locations of that register so that these storage locations can receive the locations of the points of set 154 and its conjugate. Controller 92 then transmits the intensities of the set of points 154 and the intensities of the points lying along an interval 156 on line 146 to correlator 94. The center of interval 156 is spaced a distance from the center of set 152 that is equal to the spacing between the center of sets 150 and 154. Interval 156 includes more than the number of points included in set 154 because differences in elevation between various points on the stereo images causes sets of conjugate image points to be spaced slightly differently along corresponding epipolar lines to two stereo images taken from different vantage points. However, since ordinarily the spacing between sets 150 and 154 will be relatively small, the spacing between set 152 and set 158 of points conjugate to set 154 will not be significantly different from the spacing between sets 150 and 154. Interval 156 can therefore be relatively short, and may for many applications include only two points more than the number of points in the sets being inspected. Controller 92 thus significantly increases to the speed at which stereomapper 10 is able to identify conjugate sets of points by limiting the information that need be supplied to correlator 94. Set 154 need only be compared with a small number of sets along epipolar line 146 in order to identify the set 158 of points conjugate to set 154. The coordinates of the points forming sets 154 and 158 are used in a manner similar to that of sets 150 and 152 to limit the search for subsequent sets of conjugate points along epipolar lines 142 and 146.

Controller 92 uses the locations of various sets of points along lines 142 and 146 to limit the number of points that need be inspected in order to identify sets of conjugate points along subsequent epipolar lines such as lines 144 and 148. For example, in order to find the set of points on line 148 conjugate to a set 160 of points on line 144 located at a position corresponding to the position of set 150 on line 142, correlator 94 compares set 160 with only those points within an interval 162 along line 148. The center of interval 162 is located at a position along line 148 corresponding to the position of the center of set 152 along line 146. Even though the set 164 of points conjugate to the set 160 may occupy a position along line 148 that is slightly different from the position of set 152 along line 146, the position of set 164 on line 148 will generally only be slightly different from that of set 152 on line 146 as long as epipolar lines 142 and 144, and epipolar lines 146 and 148 are relatively close together. Interval 162 for most applications will, therefore, have only slightly more points than are included in set 164. The mapper 10, therefore, rapidly identifies set 164 on stereo image 20 of points conjugate to set 160 on stereo image 18.

The relative spacing between conjugate imagery changes from one part of an image to another on most stereo images. Stereomapper 10 thus defines the positions of sets on each new pair of corresponding epipolar lines with respect to the positions of sets on a previously correlated pair of epipolar lines located close to the new lines. That is, the positions of sets of points along lines 142 and 146 are used to control the correlation measurements along line 144 and 148. The positions of sets of points along lines 144 and 148 are then used to control correlation measurements along the next lines across stereo images 18 and 20.

Because the relative spacing of conjugate imagery changes along the line in a continuous fashion, it is advantageous to modify the location of image data in the storage. This is done by interpolating between already measured conjugate sets. The coordinates of points identified to be conjugate points are stored in predetermined locations of register 98 and are subsequently transmitted to calculator 64 which uses those coordinates to calculate the X, Y, and Z coordinates of each point in the actual scene represented by a pair of conjugate points on stereo images 18 and 20. The information provided to calculator 64 is the same as that provided by any other mapping apparatus, namely the X and Y coordinates of conjugate points. The calculations performed by calculator 64 to identify the coordinates of points in the scene represented by stereo images 18 and 20 are therefore conventional.

Figure 5:
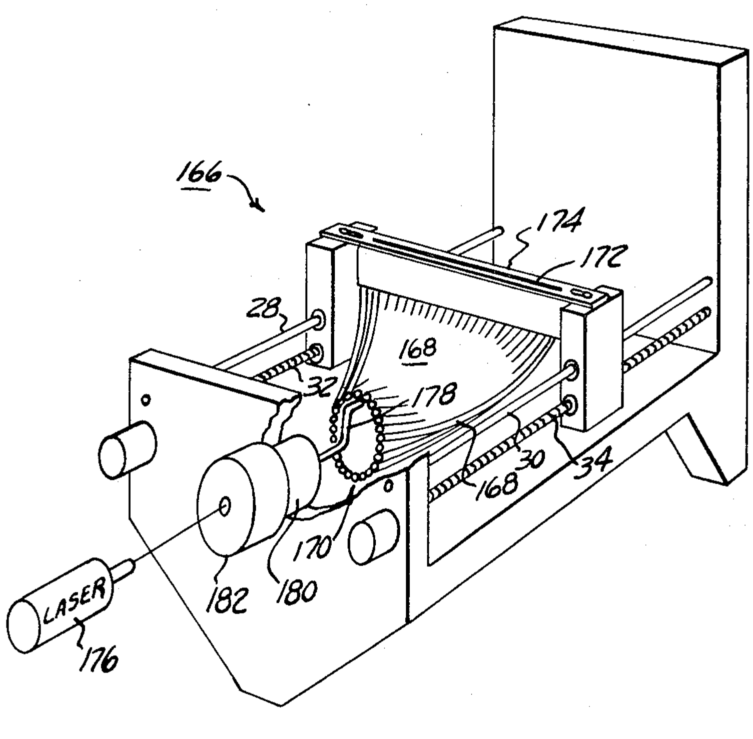
FIG. 5 is a perspective view of a modified portion of the apparatus of FIG. 1 that employs fiberoptic elements to rapidly scan a light spot across stereo images.

There are a number of modifications that can be made to the above-described construction and operation of the mapper 10. FIG. 5 illustrates a modification 166 of the mechanical scanning apparatus 14 included in stereomapper 10 of FIG. 1. The scanning apparatus 166 scans illuminated spots of light across stereo images 18 and 20 at an extremely high rate of speed. The apparatus includes an array 168 of fiberoptic light transmitting elements arranged so that their input ends define a circle 170 and their output ends define a line 172. The output ends of array 168 are held by a block 174 which is movably mounted on guides 28 and 30. The scanning apparatus 166 also includes a laser generator 176 aligned with the center of circle 170 for providing a thin beam of laser light, and a bent fiberoptic transmitting element 178 for transmitting light from laser source 176 to the input ends of fiberoptic elements forming array 168. Rotation of element 178 sequentially transmits light from laser generator 176 to the input ends of the various fiberoptic transmitting elements comprising array 168 and thereby moves a spot of light along line 172. A motor 180 capable of rotating element 178 very rapidly so that a light spot can be scanned very quickly along line 172 is connected to that element. An encoder 182 similar to encoders 68, 70, and 72 provides output signal pulses in response to rotation of motor 180 that can be summed to provide a feedback signal identifying the position of a light spot along line 172. As was the case with the apparatus 14 illustrated in FIG. 1, the light spot can be scanned along fan lines to thereby move the illuminated spot along corresponding epipolar lines of stereo images taken at different elevations simply by adjusting motors 38 and 40 so that line 172 is skewed with respect to the X axis of the stereomapper.

Figure 6:
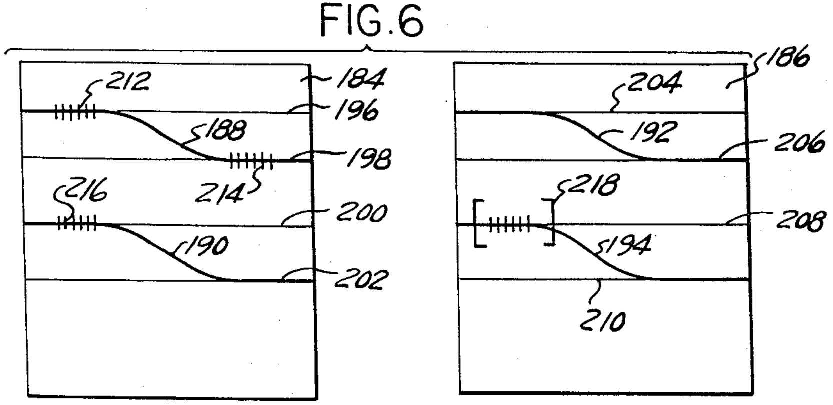
FIG. 6 is a plan view of two stereo images having curved epipolar lines to illustrate an additional mode of operation for the apparatus of FIGS. 1 and 5.

It is not necessary to have stereo images with straight epipolar lines, and it is not necessary to shape the scan of light spots across stereo images so that they follow corresponding epipolar lines in order to limit correlation to a measurement of the correlation between points lying along corresponding epipolar lines. FIG. 6 shows two stereo images 184 and 186 having curved epipolar lines. Curved epipolar lines may occur for example on a photographic stereo image provided by a camera having a lens that introduces some distortion into the images produced. Two curved epipolar lines 188 and 190 are illustrated on stereo image 184 and two curved epipolar lines 192 and 194 are illustrated on stereo image 186 that correspond to lines 188 and 190 on stereo image 184. Scanning apparatus such as the apparatus 14 illustrated in FIG. 1 and apparatus 166 illustrated in FIG. 5 may scan illuminated points across the two stereo images along straight lines such as lines 196, 198, 200 and 202 on stereo image 184 and lines 204, 206, 208 and 210 on stereo image 186. Conjugate points can be identified by recording the intensities of points along several scan lines on each image. Controller 92 and correlator 94 may then compare say a set of points 212 along can line 196 with sets of points along a number of scan lines on image 186 such as lines 204 and 206 in order to identify a set of points conjugate to set 212. Similarly, a set of points 214 along line 198 would be compared with sets of points along more than one line on stereo image 186 in order to identify the set of points on stereo image 186 conjugate to set 214. After recording the positions of conjugate points along several scan lines so that the approximate difference in curvature between the scan lines and the epipolar lines is known, controller 92 may utilize the stored locations of conjugate sets of points to limit correlation measurements for a set of points such as set 216 along lines 190 and 200 to a measurement of the correlation between that set and only those sets of points within an interval 218 along lines 194 and 208 on stereo image 186. It is not necessary to continually compare sets of points along one scan line with sets of points along several different scan lines and the curvature of the epipolar lines is known.

There are a number of modifications that may be made to the construction and operation of the stereomapper 10 in addition to those indicated by FIGS. 5 and 6. For example, stereomappers other than projection stereomappers may be used to measure the correlation between points lying along corresponding epipolar lines on two stereo images. A projection type stereomapper such as the stereomapper 10 first places two stereo images of a scene in the same relative position that cameras would physically to form those images. It is very time-consuming to physically orient the stereo images in this manner. There are a number of known stereoplotters that use a computer to simulate this relative orientation. The stereo images may be oriented in any desired manner. Mathematic translation between the positions occupied by the stereo images and the positions those stereo images would occupy if properly oriented in a projection type stereomapper are used to control scanning across each stereomapper. A stereomapper utilizing a computer for simulating the proper orientation of the two stereo images may include apparatus for limiting correlation measurements to points along corresponding epipolar lines. As another example of a stereomapper other than a projection stereomapper that may be used with the apparatus of this invention, a stereomapper is described in Application Ser. No. 122,844, assigned to The Bendix Corporation, in which it is unnecessary to orient images either mathematically or physically before extracting coordinate information from those images. The control apparatus of this invention for limiting correlation measurement to the measurement of the correlation between points lying substantially along corresponding epipolar lines of two stereo images can also be used with this stereomapper.

These and other modifications to the illustrated apparatus may be made by those practicing this invention.

Therefore, what is claimed is:

1. In a device for measuring the correlation between points on stereo images in order to identify conjugate points on said stereo images, a maximum correlation being obtained between conjugate points, the improvement comprising:

control means for limiting said correlating measurement to the measurement of the correlation between points lying substantially along corresponding epipolar lines on said two stereo images.

2. A device for identifying conjugate points on two stereo images comprising:

means for holding two stereo images;

means for directing light to strike and be modulated by said two held stereo images;

means for measuring the correlation between the intensities of modulated light representing points on one of said stereo images with modulated light representing points on the other of said stereo images to identify conjugate points on said two stereo images; and control means for limiting said correlation measurements to the measurement of the correlation between points lying substantially along corresponding epipolar lines on said two stereo images.

3. The device of claim 2 in which:

said light directing means directs light to illuminate one point on each of said stereo images, and includes means for scanning said illuminated points across said two stereo images; and said control means include:

means for controlling said scanning means to scan said illuminated points substantially along epipolar lines on said two stereo images; and means for controlling the transmission of information to said correlation measuring means to limit said correlation measurements to the measurement of the correlation between points on corresponding scanned lines of said two stereo images.

4. The device of claim 3 in which:

said scan control means is adapted to scan said illuminated points substantially along epipolar lines of photographic stereo images of a scene taken from different vantage points at the same elevation and thereby scans the illuminated point on each stereo image along lines parallel to the projection of the line connecting the vantage points of each of said stereo images onto each of said stereo images.

5. The device of claim 4 in which:

said scanning means comprises means for scanning a point light source along a reference plane;

said holding means comprise means for holding photographic images having projection centers in positions relative to each other corresponding to the relative positions of photographic film during the formation of said images, said holding means including lens means disposed at the projection centers of each of said held stereo images for focusing said point light source onto said two stereo images; and said scan control means scans said point source along lines in said reference plane parallel to the line connecting the projection centers of said two stereo images in order to thereby scan said illuminated points along epipolar lines on said two stereo images.

6. The device of claim 3 in which:

said scan control means is adapted to scan said illuminated points substantially along epipolar lines of photographic stereo images of a scene taken from different vantage points at different elevations and thereby scans the illuminated point on said one stereo image along straight lines that project from the point at which a straight line connecting the vantage points of each stereo image intersects the plane of said one stereo image, and scans the illuminated point on said other stereo image along straight lines that project from the point at which a straight line connecting the vantage points of each stereo image intersects the plane of said other stereo image.

7. The device of claim 6 in which:

said scanning means includes means for scanning a point source of light along a reference plane;

said holding means comprise means for holding photographic images having projection centers in positions relative to each other corresponding to the relative positions of photographic film during the formation of said images, said holding means including a lens means disposed at the projection centers of each of said stereo images for focusing said light source onto said two stereo images and said scan control means scans said point light source along straight lines that project from the point at which a straight line connecting the projection centers of said two stereo images intersects said reference plane in order to thereby scan said illuminated points along epipolar lines of said two stereo images.

8. The device of claim 2 in which:

said correlation measuring means includes means for measuring the correlation between the intensities of light modulated by a set of points along an epipolar line on one of said stereo images and the intensities of light modulated by a plurality of sets of points along a corresponding epipolar line on said other stereo image to identify the set of points along said epipolar line on said other stereo image having a maximum correlation with said set of points along said epipolar line on said one stereo image, a maximum correlation being obtained between sets of conjugate points.

9. The device of claim 8 in which:

said control means includes means for controlling the transmission of information to said correlation measuring means, each set transmitted by said control means comprising a set of adjacent points lying substantially along an epipolar line on a stereo image, said plurality of sets of points on said other stereo image including at least two sets of points having a plurality of points in common, each of said two sets also including one point not included in the other of said two sets.

10. The device of claim 9 in which said control means include:

means for recording the position of the first set of points along a first epipolar line on said one stereo image, and for recording the position of the set of points conjugate to said first set of points along a first epipolar line across one said other stereo image; and means for limiting the correlation measurement for a second set of points disposed at a position on a second epipolar line on said one stereo image corresponding to the position of said one set of points along said first epipolar line on said one stereo image, said correlation measurement being limited to a measurement of the correlation between said second set of points and the sets of points lying along only a portion of a second epipolar line on said other stereo image, said portion including a position along said second epipolar line on said other stereo image corresponding to the position of said set of conjugate points along said first epipolar line on said other stereo image.

11. The device of claim 10 in which:

said recording means includes means for recording the positions of said sets of points along said second epipolar lines on said stereo images; and said control means includes means for utilizing said recorded positions of said sets of points along said second epipolar lines to limit correlation measurements along third corresponding epipolar lines across said stereo images.

12. The device of claim 9 in which:

said control means includes means for recording the position of a first set of points along an epipolar line on said one stereo image and for recording the position of the set of points conjugate to said first set of points along a corresponding epipolar line on said other stereo image; and said control means includes means for limiting the correlation measurement for a second set of points lying along said epipolar line to a measurement of the correlation between said second set of points and the sets of points lying along only a portion of said corresponding epipolar line, said portion including the position spaced a distance from said conjugate set of points equal to the spacing between said first and second sets of points on said one epipolar line.

13. The device of claim 12 in which:

said recording means includes means for recording the positions of said second sets of points and the set of points conjugate to said second set of points; and said control means includes means for utilizing said recorded positions of said second set of points and said points conjugate to said second set to limit the correlation measurements for a third set of points lying along said epipolar line.

14. The device of claim 2 further including:

calculating means for using the positions of points identified to be conjugate points to calculate the actual positions of a point represented by a pair of conjugate points on said two stereo images; and means for transmitting the locations of points identified to be conjugate points to said calculating means.

15. The device of claim 2 in which:

said light directing means includes a high intensity light source for illuminating said two stereo images, the high intensity of said light source causing light modulated by each of said two stereo images to have a high signal to noise ratio, and thereby permitting highly accurate correlation measurements to be made.

16. The device of claim 15 in which said high intensity light source comprises a source of laser light.

17. The device of claim 2 in which:

said light directing means directs light to illuminate one point on each of said stereo images, and includes means for scanning said illuminated points across said two images along lines forming an angle with at least a portion of epipolar lines on said two stereo images; and said control means includes means for limiting correlation measurements for a first point disposed along a first portion of an epipolar line on said one stereo image to a measurement of the correlation between said first point and points lying along a first scan line across said other stereo image, and for limiting correlation measurements for a second point disposed along a second portion of said epipolar line to a measurement of the correlation between said second point and points disposed along a second scan line across said other stereo image, all points conjugate to the points disposed along said epipolar line on said one stereo image being disposed along a corresponding epipolar line on said other stereo image, said first scan line being proximate said corresponding epipolar line along a first portion of said other stereo image, and said second scan line being proximate said corresponding epipolar line along a second portion of said other stereo image.

* * * * *